United States Patent [19]
Grigory et al.

[11] Patent Number: 5,920,976
[45] Date of Patent: Jul. 13, 1999

[54] APPARATUS AND METHOD FOR REMOTELY SEALING A DAMAGED PIPE

[75] Inventors: Stephen Cecil Grigory; Jesse Abergo Villarreal, both of San Antonio; Jeffrey Gene Wright, Bulverde; Donald Wade Johnson, San Antonio, all of Tex.

[73] Assignee: Gas Research Institute, Chicago, Ill.

[21] Appl. No.: 08/898,724

[22] Filed: Jul. 22, 1997

[51] Int. Cl.[6] .................................................. B23P 6/00
[52] U.S. Cl. ................................ 29/402.09; 29/402.12; 29/402.14; 29/402.15; 137/15; 137/315; 138/97
[58] Field of Search ........................... 156/94, 294, 423; 138/94, 97, 98, 99; 29/270, 278, 282, 402.09, 402.12, 402.14, 402.15; 269/49; 137/15, 315, 318; 81/15.5, 15.7

[56] References Cited

U.S. PATENT DOCUMENTS

| | | |
|---|---|---|
| 150,255 | 4/1874 | Phillips . |
| 156,198 | 10/1874 | Wood . |
| 503,079 | 8/1893 | Gowen . |
| 564,251 | 7/1896 | Long . |
| 573,049 | 12/1896 | Syme ........................................ 81/15.5 |
| 607,379 | 7/1898 | Jones ........................................ 81/15.5 |
| 645,502 | 3/1900 | Carpenter . |
| 776,697 | 12/1904 | Sieverling ................................. 138/98 |
| 1,131,745 | 3/1915 | Stephens . |
| 1,606,602 | 11/1926 | Stauffer . |
| 3,044,920 | 7/1962 | Dewar . |
| 3,094,964 | 6/1963 | Witten et al. . |
| 3,275,023 | 9/1966 | Raspante ................................. 137/315 |
| 3,841,256 | 10/1974 | Etchelecou et al. . |
| 4,291,727 | 9/1981 | Yie et al. . |
| 4,408,649 | 10/1983 | Litterini . |
| 4,509,243 | 4/1985 | Schneider et al. . |
| 4,574,971 | 3/1986 | Leonard . |
| 4,802,388 | 2/1989 | Roberts . |
| 4,892,219 | 1/1990 | Smith . |
| 5,058,519 | 10/1991 | Collins . |
| 5,143,012 | 9/1992 | Elkowitz . |
| 5,199,464 | 4/1993 | Savard . |
| 5,247,967 | 9/1993 | Bourque ................................... 138/99 |
| 5,609,715 | 3/1997 | Gallentine ............................. 156/394.1 |
| 5,690,139 | 11/1997 | Murphy et al. . |

FOREIGN PATENT DOCUMENTS 324755  2/1930  United Kingdom .

*Primary Examiner*—Steven D. Maki
*Assistant Examiner*—Shawn A. Mitchell
*Attorney, Agent, or Firm*—Factor and Shaftal

[57] ABSTRACT

A remote pipe sealing system comprising an insertion tool and a seal apparatus for providing sealing to a damaged pipe. The sealing apparatus includes a cover member and a tool attachment member. The insertion tool includes a guide member and a handle having an outer tube and an inner shaft slidably positioned within the outer tube. The guide member is slidably associated with the outer tube. Additionally, the insertion tool includes a member for releasably attaching the tool attachment member to the inner shaft of the handle. The releasable attachment member enables releasable controlled positioning of the cover member within the outer tube of the handle. The invention further includes a method for remotely repairing damaged pipes.

14 Claims, 2 Drawing Sheets

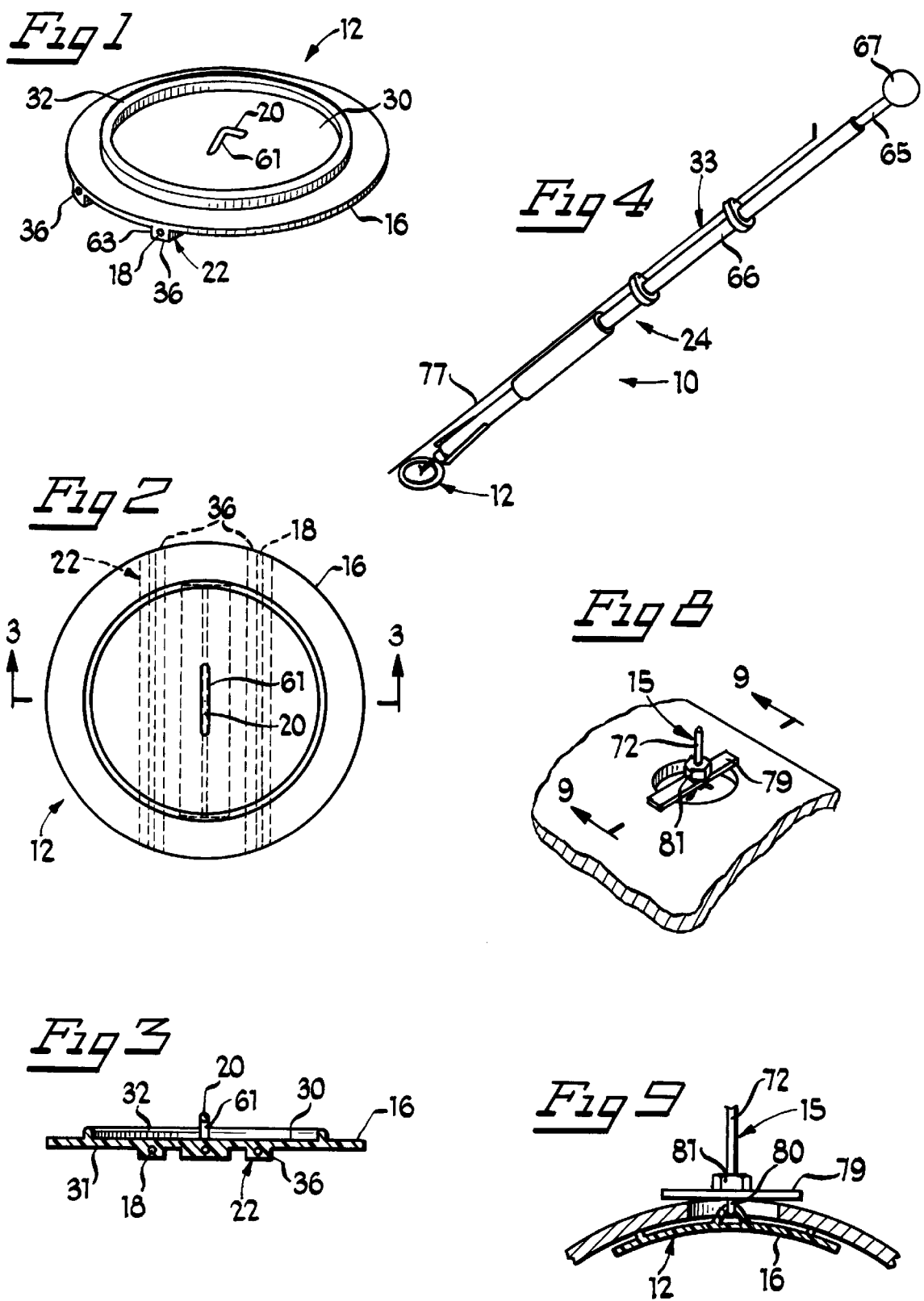

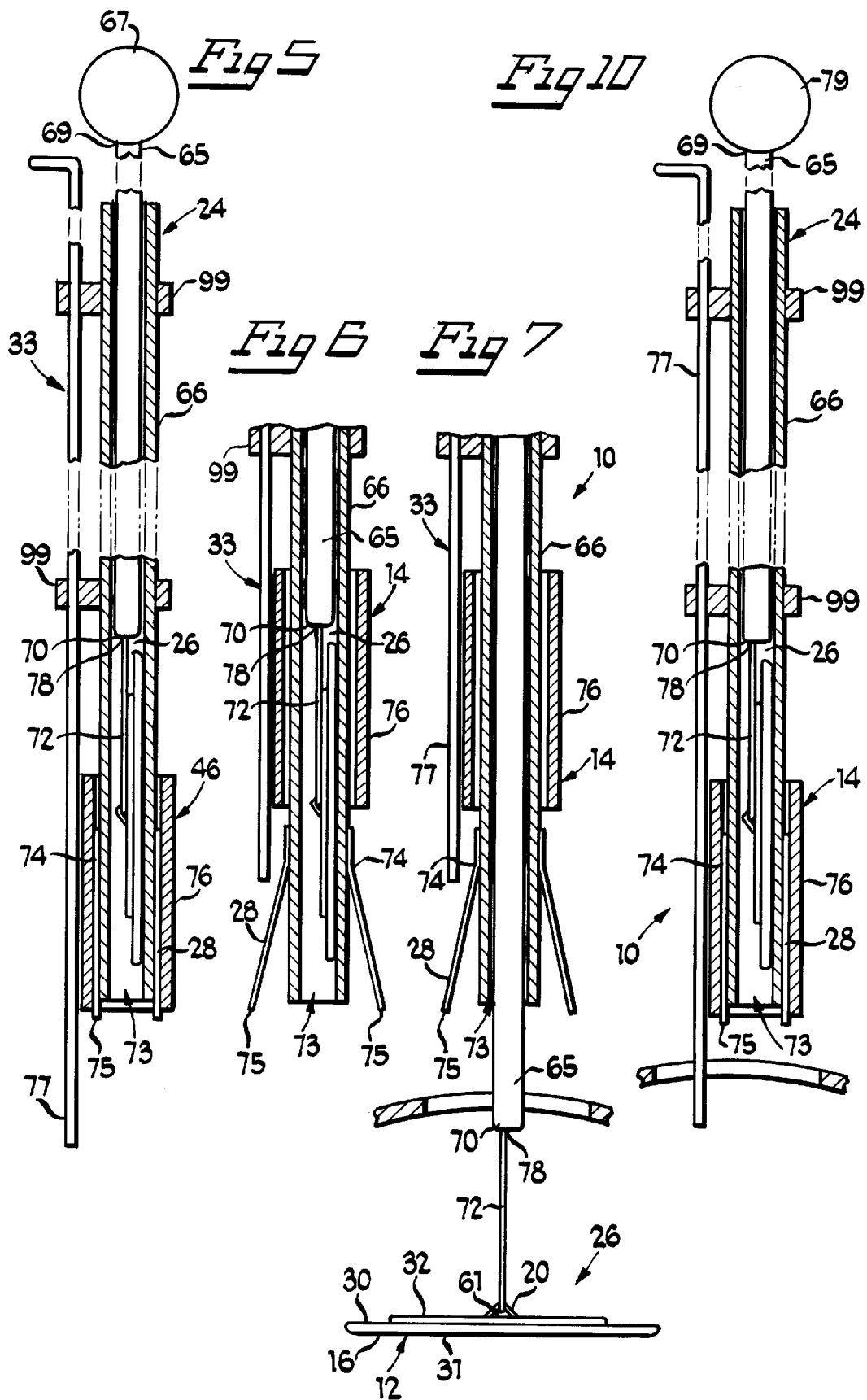

APPARATUS AND METHOD FOR REMOTELY SEALING A DAMAGED PIPE

BACKGROUND OF THE INVENTION

1. Field of the Invention

The present invention is directed to pipe sealing systems, and, more specifically, to a seal system for remotely applying a seal to a damaged pipe without substantially affecting the flow of fluid through the pipe.

2. Background Art

Pipelines have long been used for the transportation, movement, and disposal of liquids and gasses. These pipes are often exposed to elements such as temperature extremes, precipitation, solar radiation, etc. Pipes, such as plastic pipes, which are increasingly used in the transportation of natural gas, are quite susceptible to these elements. Additionally, at some point during its service life, it is likely that such pipes will develop leaks due to workers digging too close to the pipes, as well as due to the knocking away of fittings.

Repair to a damaged pipe is quite difficult and each method has inherent drawbacks. One manner of repair consists of stopping the flow of the fluid and replacing the damaged section of pipe. The major drawback of this procedure lies with both the need to disrupt service in the pipe, and the labor and time costs associated therewith. Not only will the customer be without service, but the replacement requires new pipes, fittings and many labor hours.

Certain sealing type devices have been introduced that do not require the replacement of sections of the pipe. Many of these sealing methods, nevertheless, require the stopping of fluid for some period of time. Other seals are only a temporary "band aid" which must later be replaced with more permanent solutions. Moreover, where the fluid is volatile, there is an additional hazard involved inasmuch as these solutions require a repairman to be quite close to the damaged portion of the pipe.

SUMMARY OF THE INVENTION

The present invention is concerned with a pipe sealing system for remotely repairing damaged pipes and a method for remotely repairing damaged pipes.

The invention comprises a remote pipe sealing system which includes an insertion tool and a seal apparatus for providing a seal to a damaged pipe. The seal apparatus comprises a cover member which includes a top surface and means for attaching the insertion tool to the cover member. The insertion tool includes a handle having an outer tube and an inner shaft, an attachment region associated with the inner shaft for attachment of the cover member to the insertion tool and a guide member slidably associated with the handle. The attachment region enables releasable controlled positioning of at least a portion of the cover member within the outer tube of the handle member. The guide member facilitates insertion of the insertion tool into the opening.

In a preferred embodiment, the insertion tool further includes stabilizing members which substantially eliminate inadvertent movement of the cover member, relative to the insertion tool, upon deployment of the cover member entirely outside of the interior region of the insertion tool. In such a preferred embodiment, the stabilizing member is attached to the outer tube of the handle member.

It is also contemplated that the insertion tool further includes means for precluding deployment of the stabilizing member. The deployment preclusion means is associated with the guide member so that slidable movement of the guide member likewise slides the deployment preclusion means.

The method for remotely repairing damaged pipes without substantially affecting the flow of a medium within the pipes during repair comprises the steps of (a) locating the damaged portion of the damaged plastic pipe; (b) attaching a cover member to an insertion tool; (c) positioning at least a portion of the cover member within an outer tube of the insertion tool; (d) inserting at least a portion of a guide member into the damaged pipe at the damaged portion, where the guide member is slidably associated with the outer tube of the insertion tool; (e) inserting at least a portion of the insertion tool and the cover member into the damaged pipe through an aperture located at the damaged portion; (f) releasing the cover member from within the outer tube of the insertion tool while maintaining attachment of the cover member thereto; (g) removing the insertion tool from within the damaged pipe while maintaining attachment to the cover member, (h) positioning the cover member to seal the damaged pipe; and (i) detaching the insertion tool from the cover member.

In a preferred embodiment, the method may include the step of deploying a stabilizing member after the step of releasing the cover member from within the outer tube of the insertion tool. Further, the cover member may require bending prior to the step of positioning at least a portion of the cover member within the outer tube.

In yet another preferred embodiment, the method may further include the step of precluding deployment of the stabilizing means prior to the step of inserting the tool into the pipe. In such an embodiment, the guide member is slidably attached to the preclusion deployment means and the step of precluding deployment comprises the step of sliding the guide member relative to the outer tube over the stabilizing means.

BRIEF DESCRIPTION OF THE DRAWINGS

For a better understanding of the present invention, reference may be had to the accompanying drawings in which:

FIG. 1 is a perspective view of the present seal apparatus;

FIG. 2 is a top view of the seal apparatus;

FIG. 3 is a cross-sectional view of the seal apparatus taken generally along lines 3—3 of FIG. 2;

FIG. 4 is a perspective view of the present seal system;

FIG. 5 is a cross-sectional view of the present insertion tool of the present seal system apparatus, showing in particular the seal apparatus within the interior region of the insertion tool;

FIG. 6 is a partial cross-sectional view of the present insertion tool showing in particular the stabilizing members;

FIG. 7 is a partial cross-sectional view of the present insertion tool showing in particular the seal apparatus in a deployed position;

FIG. 8 is a perspective view of the seal apparatus in the installed position;

FIG. 9 is a cross-sectional view of the seal apparatus in the installed position, taken generally along lines 9—9 of FIG. 8; and FIG. 10 is a cross-sectional view of the present invention tool, showing, in particular, insertion of the guide into the aperture.

DETAILED DESCRIPTION OF THE DRAWINGS

While this invention is susceptible of embodiment in many different forms, there is shown in the drawings and will herein be described in detail, one specific embodiment with the understanding that the present disclosure can be considered as an exemplification of the principles of the invention and is not intended to limit the invention to the embodiment illustrated.

Seal system 10 for remotely sealing a damaged portion of a damaged pipe is shown in FIGS. 1 and 4 as comprising seal apparatus 12, insertion tool 14 and locking means 15. Seal apparatus 12 is shown in FIGS. 1–3 as comprising cover member 16, means 18 for providing rigidity to the cover member, means 20 for attaching an insertion tool and means 22 for facilitating the controlled bending of the cover member.

Cover member 16 is shown in FIGS. 1 and 3 as including top surface 30, bottom surface 31 and continuous outer ridge 32. Top surface 30 and bottom surface 31 are of a substantially uniform flat configuration, thus rendering a substantially uniform thickness. However, different sized and shed cover members are likewise contemplated. Continuous outer ridge 32 extends upward and fully about top surface 30. As will be explained, continuous outer ridge 32 engages the interior surface of the pipe and contributes to the integrity of the seal about the aperture of the pipe. Preferably, cover member 16 is molded from an elastic material, such as rubber or the like, however other synthetic and natural materials are likewise contemplated for use.

Rigidity means 18 is shown in FIGS. 1–3 as comprising rod members, such as rod member 36. Rod members 36 are molded into cover member 16, spaced a predetermined distance apart and positioned substantially parallel to each other. It is also contemplated that the rod members may be attached or otherwise bonded to top surface 30, or, bottom surface 31 of the cover member. Additionally, rod members may be of a uniform cross-section such as a uniform circular cross section, as well as of a non-uniform cross-section. Generally, the rod members are constructed from a material having a tensile strength greater than the tensile strength of cover member 16; such materials for the rod member may include various polymers, composites and/or metals.

Insertion tool attachment means 20 is shown in FIGS. 1–3 and 7 as comprising notch member 61. Notch member 61 comprises an U-shaped section bent into the center rod member that extends out of cover member 16, to define an opening. Of course, other configurations for rendering a means by which to attach the cover member to an outside tool are also contemplated, including for example, mating Velcro strips, ball and socket engagements and electromagnets, among others.

Controlled bending facilitating means 22 is shown in FIGS. 1 and 3 as comprising encasement members, such as encasement member 63. Encasement member 63 comprises a variation in the configuration of the cover member 16 so as to promote bending of the cover member about the encasement member. While the cover member can be bent as desired without the use of these encasement members, the encasement members simplify bending and also facilitate proper bending thereof.

Insertion tool 14 is seen in FIGS. 4–7 as comprising handle member 24, attachment region 26 which attaches to cover member 16, stabilizer members, such as stabilizer member 28, means 46 for precluding deployment of stabilizer members, and guide member 33. Handle member 24 comprises outer tube 65 and inner shaft 66. Outer tube 65 includes opening 73 therethrough corresponding approximately to the diameter of inner shaft 66. It is contemplated that handle member 24 may be in excess of 6–15 ft long (or even longer), thus permitting the user to be positioned at a substantial distance away from the damaged portion of the damaged pipe.

As shown in FIG. 5, inner shaft 66 includes top end 69, bottom end 70 and threaded opening 78. Inner shaft 66 is slidably positioned in opening 73 of outer tube 65, wherein the inner shaft is slightly longer than outer tube 65. Stop ball member 67 is positioned at top end 69 of inner shaft member 66, to preclude inadvertent slidable disengagement of the inner shaft member from the outer tube.

Attachment region 26 is shown in FIGS. 5–7 as comprising hook member 72 which is threaded into opening 78 of bottom end 70 of inner shaft 66. Hook member, as explained above, matingly engages insertion tool attachment means 20. Also as explained, other attachment means are contemplated for use with insertion tool attachment means 20, and, in turn, attachment region 26.

Stabilizing members 28 are shown in FIGS. 5–7 as each including attachment end 74 and second end 75. Attachment end 74 is pivotally attached to outer tube 65, and second end 75 extends downward beyond the end of outer tube 65. Stabilizing member 28 is permitted to pivot about attachment end 74 through a predetermined arcuate distance. While it is contemplated that stabilizing members may comprise a single stabilizing member, preferably, two or more stabilizing are positioned about outer tube 65. It is further contemplated that the second end may be of a particular configuration which fosters contact with the cover member, such as a "T" shape, or, one which includes an enlarged second end.

Means 46 for precluding deployment of stabilizing members is shown in FIGS. 4–7 as comprising cylinder 76. Cylinder 76 is substantially coaxial to and slidable relative to outer housing 65. The inner diameter of cylinder 76 is sufficiently large to permit the cylinder to slide over outer tube 65 and over stabilizing members 28.

Guide member 33 comprises guide rod 77 and restraints, such as restraint 99. Guide rod 77 is positioned on the outside of outer tube 65 and slidably positionable relative to the outer tube. Guide rod 77 extends the length of the outer tube and is maintained in the proper desired position by restraints 99. Additionally, guide rod 77 is attached to cylinder 76, so that slidable movement of guide rod 77 likewise moves cylinder 76.

Locking movement 15 is utilized to lock the seal apparatus upon positioning within the pipe. Locking means 15 is shown in FIGS. 8 and 9 as comprising bar member 79 and nut 81. Bar member includes opening 80 which is configured to accept hook member 72. Likewise, nut 81 is intended to threadedly engage hook member 72.

In operation, once the aperture that is to be repaired is isolated, a desired seal apparatus is chosen. The choice of seal apparatus is based on several factors, including, but not limited to, the size of the aperture, the location of the aperture on the pipe, and the pressure of the fluid escaping from the opening. Once selected, the seal apparatus is then attached to the insertion tool. Specifically, inner shaft member 66 is slid relative to outer tube 65 until hook member 72 is exposed. Next, notch member 61 of seal apparatus 12 is attached and secured to hook member 72.

Once attached, seal apparatus 12 is pivoted/rotated about hook member 72 until rod members are positioned substantially parallel to inner shaft member 66. The seal apparatus is then rolled parallel to the rod members and about controlled bending facilitating means 22 to be sufficiently tight so as to be capable of fitting within outer tube 65 of handle member 24. As explained above, controlled bending facilitating means 22 serve to aid in the bending of seal apparatus 12 at predetermined desired locations.

Next, inner shaft 66 is slid relative to outer tube 65 until at least a portion of seal apparatus 12 is positioned within outer tube 65. As such, outer tube 65 precludes seal apparatus 12 from unrolling and returning to its original substantially flat shape, and additionally precludes any pivoting of the seal apparatus about hook member 72.

Lastly, guide rod 77, and, in turn, cylinder 76, are slid relative to outer tube 65, to extend guide rod 77 beyond the end of outer tube 65. Since the guide rod 77 is attached to cylinder 76, the slidable movement of the guide rod and, in turn, positions the cylinder to cover at least a portion of stabilizing members 28, to maintain the stabilizing members in the undeployed position and to preclude inadvertent deployment of stabilizing members 28 before such deployment is desired. The tool is now "loaded" and ready for use.

As shown in FIG. 10, guide rod 77 is inserted into the damaged plastic pipe through the aperture. Inasmuch as guide rod 77 tends to be substantially smaller than the aperture, the guide rod may be inserted quite easily even as fluid exits through the aperture at an elevated pressure, and even if the tool has an exceedingly long handle. As such, the guide member facilitates the insertion of the remainder of the insertion tool.

Once the guide member is inserted, the remainder, insertion tool is then inserted as necessary, outer tube 65 is slidably moved relative to the inner shaft 66 to force hook member 72, and, in turn, seal apparatus 12 out from within outer tube 65. As the seal apparatus exits from within the outer tube, the cover member 16 unrolls and returns to its original/flat configuration.

Due to the flow of the fluid through the damaged pipe, once released, the seal apparatus may tend to "flutter" and pivot about hook 72. As shown in FIG. 7, to minimize this pivoting/fluttering of the seal apparatus, guide rod 77, and, in turn, cylinder 76 are slidably moved relative to the outer tube, and away from the opening. This serves to expose stabilizing members 28 and to remove guide rod 77 from within the pipe, which is no longer needed once the insertion tool is positioned into the aperture. Once cylinder 76 is moved, stabilizing members 28 pivot outward about their respective attachment ends 74 into a deployed position. Next, inner shaft 66 is slidably positioned relative to outer tube 65 until stabilizing members 28 contact seal apparatus 12, and thereby minimize any pivoting of the seal apparatus.

Next, insertion tool 14 is fully retracted out of the damaged plastic pipe. As the insertion tool is removed, inasmuch as the "deployed" seal apparatus 12 is larger than the opening, it covers (from the inside) the aperture of the damaged pipe. The outward pressure exerted by the fluid additionally forces the seal apparatus against the inner surface of the damaged pipe. More specifically, as seen in FIG. 9, continuous outer ridge 32 becomes pressed against the inner surface of the damaged pipe thus making a continuous, substantially air tight seal around the aperture.

Once the seal is properly positioned, effectively sealing the aperture, insertion tool 14 is disconnected from seal apparatus 12 by rotating inner shaft member 66 relative to hook member 72. Inasmuch as hook member 72 is threaded into inner shaft member 66, rotation of inner shaft member 66 disconnects the hook member. Alternatively, hook member 72 may be cut with cutting pliers, or hook 72 may simply be unhooked from notch member 61.

Indeed, with the use of guide rod 77, the handle of the insertion tool may be quite long, so that the repairman may be positioned at a safe distance away from the opening, which serves to minimize injury. This is especially crucial where the fluid traveling in the pipe is volatile.

Where hook member 72 is unscrewed from the inner shaft member, as shown in FIGS. 8 and 9, hook member 72 is extended through hole 80 of bar member 79. Nut 81 is secured to hook member 72 and tightened until bar member 79 rests firmly on the outside surface of the damaged pipe. For certain applications, once the seal apparatus is firmly in place, the seal apparatus may be used as a permanent solution. In other situations, a number of secondary sealing methods may be employed to provide a more rigid sealing solution. These may include plugs, patches and other systems.

The foregoing description and drawings merely explain and illustrate the invention and the invention is not limited thereto, as those skilled in the art who have the disclosure before them will be able to make modifications and variations therein without departing from the scope of the invention.

We claim:

1. A pipe sealing system comprising an insertion tool and a seal apparatus for providing a seal to an opening of a damaged pipe without substantially affecting the flow of a medium through the damaged pipe, the system comprising:

the seal apparatus comprising a cover member having a top surface, and tool attaching means for attaching the insertion tool to the cover member, wherein the cover member is rollable into a rolled orientation;

the insertion tool including:
 a handle having an outer tube and an inner shaft slidably positioned within the outer tube;
 a guide member slidably associated with the handle for facilitating insertion of the insertion tool into the opening; and
 means for releasably attaching the tool attaching means of the seal apparatus to the inner shaft, the means for releasably attaching means enabling releasable controlled positioning of the cover member from an undeployed position within outer tube, wherein the cover member is positioned in a rolled orientation parallel to an axis of the inner shaft to a deployed position wherein the cover member is orientated in an unrolled orientation substantially perpendicular to the axis of the inner shaft.

2. A pipe sealing system comprising an insertion tool and a seal apparatus for providing a seal to a damaged pipe, the system comprising:

the seal apparatus comprising a cover member having a top surface, and tool attaching means for attaching the insertion tool to the cover member;

the insertion tool including:
 a handle having an outer tube and an inner shaft slidably positioned within the outer tube;
 a guide member slidably associated with the handle for facilitating insertion of the insertion tool into the opening;
 means for releasably attaching the tool attaching means of the seal apparatus to the inner shaft, the means for releasably attaching enabling releasable controlled positioning of at least a portion of the cover member within the outer tube of the handle; and
 at least one stabilizing member pivotally associated with the outer tube to stabilize inadvertent movement of the cover member, relative to the insertion tool, upon positioning of the cover member entirely outside of the interior region of the tool.

3. The pipe sealing system according to claim 2 wherein the at least one stabilizing member comprises two stabilizing members symmetrically positioned about the outer tube.

4. The pipe sealing system according to claim 2 wherein the insertion tool further includes means for precluding inadvertent deployment of the stabilizing means, the means for precluding associated with the guide member so that slidable movement of the guide member likewise slides the means for precluding.

5. A method for repairing a damaged pipe without substantially affecting the flow of a fluid within the pipe during repair, the method comprising:

locating a damaged portion of the damaged pipe;

attaching a cover member to an insertion tool, the cover member including a top surface and means for attaching the insertion tool to the cover member, wherein the cover member is rollable into a rolled orientation;

rolling the cover member about an axis;

positioning at least a portion of the cover member within an outer tube of the insertion tool;

inserting at least a portion of a guide member into the damaged pipe at the damaged portion, the guide member slidably associated with the outer tube of the insertion tool;

inserting at least a portion of the insertion tool and the cover member into the damaged pipe at the damaged portion;

releasing the cover member from within the outer tube of the insertion tool while maintaining attachment of the cover member thereto, which, in turn, unrolls the cover member to an unrolled orientation;

removing the insertion tool from within the damaged portion of the damaged pipe while maintaining attachment of the cover member thereto;

positioning the cover member in a sealing orientation relative to the damaged portion of the damaged pipe; and detaching the insertion tool from the cover member.

6. A method for repairing a damaged pipe without substantially affecting the flow of a fluid within the pipe during repair, the method comprising:

locating a damaged portion of the damaged pipe;

attaching a cover member to an insertion tool;

positioning at least a portion of the cover member within an outer tube of the insertion tool;

inserting at least a portion of a guide member into the damaged pipe at the damaged portion, the guide member slidably associated with the outer tube of the insertion tool;

inserting at least a portion of the insertion tool and the cover member into the damaged pipe at the damaged portion;

releasing the cover member from within the outer tube of the insertion tool while maintaining attachment of the cover member thereto;

deploying a stabilizing member after the step of releasing the cover member from within the interior region of the insertion tool, to stabilize the cover member;

removing the insertion tool from within the damaged portion of the damaged pipe while maintaining attachment of the cover member thereto;

positioning the cover member in a sealing orientation relative to the damaged portion of the damaged pipe; and detaching the insertion tool from the cover member.

7. The method according to claim 6 further including the step of precluding deployment of the stabilizing member prior to the step of inserting the insertion tool into the damaged portion of the damaged pipe.

8. The method according to claim 7 wherein the step of precluding deployment of the stabilizing member comprises the step of sliding the guide member and, in turn, means for precluding deployment of the stabilizing member, relative to the insertion tool.

9. The pipe sealing system according to claim 1 wherein the insertion tool further includes at least one stabilizing member pivotally associated with the outer tube to stabilize inadvertent movement of the cover member, relative to the insertion tool, upon positioning of the cover member entirely outside of the interior region of the tool.

10. The pipe sealing system according to claim 9 wherein the at least one stabilizing member comprises two stabilizing members symmetrically positioned about the outer tube.

11. The pipe sealing system according to claim 9 wherein the insertion tool further includes means for precluding inadvertent deployment of the stabilizing member, the means precluding associated with the guide member so that slidable movement of the guide member likewise slides the means for precluding.

12. The method according to claim 5 further including the step of:

deploying a stabilizing member after the step of releasing the cover member from within the interior region of the insertion tool, to stabilize the cover member.

13. The method according to claim 12 further including the step of precluding deployment of the stabilizing member prior to the step of inserting the insertion tool into the damaged portion of the damaged pipe.

14. The method according to claim 13 wherein the step of precluding deployment of the stabilizing member comprises the step of sliding the guide member and, in turn, means for precluding deployment of the stabilizing member, relative to the insertion tool.

\* \* \* \* \*